US011893501B2

United States Patent
Ragavan et al.

(10) Patent No.: US 11,893,501 B2
(45) Date of Patent: *Feb. 6, 2024

(54) BIG DATA BASED PREDICTIVE GRAPH GENERATION SYSTEM

(71) Applicant: Bank of America Corporation, Charlotte, NC (US)

(72) Inventors: Harish Ragavan, W. Windsor, NJ (US); Srinivasan Shanmugam, Highland Park, NJ (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/952,886

(22) Filed: Sep. 26, 2022

(65) Prior Publication Data

US 2023/0007994 A1 Jan. 12, 2023

Related U.S. Application Data

(63) Continuation of application No. 16/933,589, filed on Jul. 20, 2020, now Pat. No. 11,526,771, which is a
(Continued)

(51) Int. Cl.
*G06F 16/901* (2019.01)
*G06F 16/25* (2019.01)
(Continued)

(52) U.S. Cl.
CPC ........... *G06N 5/02* (2013.01); *G06F 16/2379* (2019.01); *G06F 16/258* (2019.01);
(Continued)

(58) Field of Classification Search
CPC .......... G06N 5/02; G06N 5/022; G06N 20/00; G06F 16/2379; G06F 16/258;
(Continued)

(56) References Cited

U.S. PATENT DOCUMENTS 8,214,308 B2    7/2012 Chu
2012/0191630 A1    7/2012 Breckenridge et al.
(Continued)

FOREIGN PATENT DOCUMENTS

EP    2821944 A1    1/2015
WO    2014/005073 A1    1/2014

OTHER PUBLICATIONS

Xin, Reynold S. et al., GraphX: Unifying Data-Parallel and Graph-Parallel Analytics, UC Berkeley AMPLab, arXiv: 1402.2394v1 [cs.DB] Feb. 11, 2014, 13 pages.
(Continued)

*Primary Examiner* — Michael Pham
(74) *Attorney, Agent, or Firm* — Banner & Witcoff, Ltd.

(57) ABSTRACT

A big data analysis system may include a big data repository communicatively coupled to a data accumulation server and a predictive graph processing system. The data accumulation server may be configured to receive information from a plurality of data sources, the information corresponding to user interaction with one or more computing devices associated with an organization via a networked computing system, store the information received from the plurality of sources in the big data repository; and monitor the plurality of data sources to update the data stored in the big data repository. The predictive graph processing system is configured to receive information stored in the big data repository, transform the information received from the big data repository into a predictive graph data set based on a predictive model, and store the predictive graph data set to a visualization data repository.

20 Claims, 5 Drawing Sheets

Related U.S. Application Data continuation-in-part of application No. 15/094,636, filed on Apr. 8, 2016, now Pat. No. 10,754,867.

(51) Int. Cl.
  *G06F 16/904* (2019.01)
  *G06N 5/02* (2023.01)
  *G06Q 50/00* (2012.01)
  *G06Q 10/0635* (2023.01)
  *G06F 16/23* (2019.01)

(52) U.S. Cl.
  CPC ........ *G06F 16/904* (2019.01); *G06F 16/9024* (2019.01); *G06Q 10/0635* (2013.01); *G06Q 50/01* (2013.01)

(58) Field of Classification Search
  CPC .... G06F 16/9024; G06F 16/904; G06F 16/28; G06Q 10/0635; G06Q 50/01
  USPC .................................. 707/602, 688; 706/46
  See application file for complete search history.

(56) References Cited

U.S. PATENT DOCUMENTS

| | | | |
|---|---|---|---|
| 2014/0279794 A1* | 9/2014 | Aliferis | G06N 20/00 706/46 |
| 2015/0026103 A1 | 1/2015 | Goldschmidt et al. | |
| 2015/0331963 A1 | 11/2015 | Barker | |
| 2017/0053242 A1 | 2/2017 | Ayyaswami | |

OTHER PUBLICATIONS

Schoenborn, Barry, Big Data Analytics Infrastructure for Dummies®, IBM Limited Edition, © 2014 John Wiley & Sons, Inc., 51 pages.
Tolbert, Doug, A Terminology Interlude: Analytics, Big Data, and Big Data Analytics, The Official Unisys Blog, Mar. 4, 2016, © Unisys 2014, 3 pages.
Dijcks, Jeane-Pierre, Oracle: Big Data for the Enterprise, An Oracle White Paper, Jun. 2013, © 2013 Oracle and/or Its affiliates, 16 pages.
Grobelnik, Marko, Big-Data Tutorial, Jozef Stefan Institute, Ljubljana, Slovenia, Stavanger, May 8, 2012, 41 pages.
Lin, Ching-Yung, Columbia University, E6893 Big Data Analytics Lecture 1: Overview of Big Data Analytics, Sep. 10, 2015, © 2015 CY Lin, Columbia University, 92 pages.
Gualtieri, Mike et al., The Forrester Wave™: Big Data Predictive Analytics Solutions, Q2 2015, Apr. 1, 2015, © 2015 Forrester Research, Inc., 18 pages.
Duong, Quang et al., Learning and Predicting Dynamic Behavior with Graphical Multiagent Models, University of Pennsylvania Scholarly Commons, Dept. of Computer and Information Science, Jun. 2012, 10 pages.
Shrestha, Joseph, Big Data, Predictive Analytics, and Data Visualization in The Construction Engineering, Iowa State University, Dec. 4, 2013, 2 pages.
Nsofor, Godswill Chukwugozie, A Comparative Analysis of Predictive Data-Mining Techniques, A Thesis Presented for the Master of Science Degree, the University of Tennessee, Knoxville, Aug. 2006, 192 pages.
Ankur, Dave et al., GraphX, Graph Analytics in Spark, UC Berkeley AMPLab, retrieved from Internet on Jan. 12, 2016, 34 pages.
Gonzalez, Joseph et al., Graphx: Unified Graph Analytics On Spark, Databricks, PowerPoint, retrieved from Internet on Jan. 12, 2016, 44 pages.
Ziff Davis, White Paper, A Visualization is Worth a Thousand Tables: How IBM Business Analytics Lets Users See Big Data, © 2014 Ziff Davis B2B, 13 pages.
McKenna, Ian, Predictive Analytics and Big Data with MATLAB, © 2015 The MathWorks, Inc., 68 pages.
Hong, Seokyong et al., Query Optimization for Graph Analytics on Linked Data Using SPARQL, ORNL/TM-2015/342, Oak Ridge National Laboratory, UT-Battelle, LLC, for the US Dept. of Energy, Jul. 8, 2015, 21 pages.
Velu, C.M. et al., Performance Analysis for Visual Data Mining Classification Techniques of Decision Tree, Ensemble and SOM, International Journal of Computer Applications (0975-8887) vol. 57—No. 22, Nov. 2012, 7 pages.
Smith, David, Revolution Analytics, Real-Time Big Data Analytics From Deployment to Production, retrieved from Internet Mar. 4, 2016, 16 pages.
SAP Cuts Data Visualization Cost, Unites Predictive Suite—Information Week, SAP Lumira Edge brings "affordable" data visualization to small- and mid-sized companies. Predictive Analytics 2.0 unites experts and business users., http://www.informationweek.com/big-data/big-data/analytics/sap-cuts-data-visualization-cost-unites-predictive-suite/d/d-id/1319468, Mar. 4, 2016, 11 pages.
Halper, Fern, TDWI Research, First Quarter 2014, Best Practices Report, Predictive Analytics for Business Advantage, © 2014 TDWI (The Data Warehousing Institute™, 31 pages.
Hall, Cameron, Big Data and Predictive Analytics, ValueCentric, LLC, HDMA Distribution Management Conference and Expo, Mar. 8-11, 2015, Orlando, Florida, 45 pages.
Franklin, Michael, Making Sense at Scale with the Berkeley Data Analytics Stack, Feb. 3, 2015, WSDM 2015 Shanghai, amplab UC Berkeley, 58 pages.
Ragavan et al., "A Novel Approach to Predictive Graphs Using Big Data", 2016 IEEE 2nd International Conference on Big Data Security on Cloud pp. 123-128; Apr. 1, 2016.

* cited by examiner

BIG DATA BASED PREDICTIVE GRAPH GENERATION SYSTEM

CROSS REFERENCE TO RELATED APPLICATION(S)

This application is a continuation of U.S. patent application No. 16/933,589 filed Jul. 20, 2022, which is a continuation-in-part of U.S. patent application Ser. No. 15/094,636 filed Apr. 8, 2016, which issued as U.S. Pat. No. 10,754,867 on Aug. 25, 2020, all of which are hereby incorporated by reference in its entirety.

BACKGROUND OF THE INVENTION

As the global population progresses rapidly in getting online and media-enabled, corresponding volumes of "cross-connections" between data points managed by an enterprise (e.g., data received from Social media sources, professional media sources, organizational data repositories, and the like) will grow rapidly. The corresponding data graphs, including connected edges and vertices, grow super-exponentially as the number of data points increases. This data growth poses a huge problem for enterprises in providing efficient yet practical methods for managing risk, analyzing large amounts of data and forming predictions based on the large volumes of both enterprise generated data and external-sourced data. Often, this rapid growth makes data management intractable for analyzing data and forming predictions based on the analyzed data in regards to critical business functions.

Currently, many challenges exist for real-time processing of large-volume data repositories (e.g., big data repositories) particularly in generating predictive models based on one or more data mining algorithms. For example, the predictive analytics that may be used for processing (e.g., predictive models, and the like) large-volume data repositories when transforming data into one or more user presentations as the large volume data repositories are most often performed using data silos, relational databases or other non-big data technologies (e.g., columnar databases, SQL appliances and the like) into user presentations. These non-big data technologies lack variety of data and may be limited to structured data analysis, opposed to text data analysis and/or log data information, and may require expensive data management support. Further, these non-big data technologies may still pose strict limits on data growth rates and/or volumes of data that may be analyzed, stored or otherwise transformed. As such, a need has been recognized for a big data processing system for processing large volumes of data in near real time to perform complex graph-based real-time business analytics using big data processing solutions (e.g., an open source cluster computing framework, a proprietary cluster computing framework, an open source graphing API for use with the open source cluster computing framework, and the like).

SUMMARY OF THE INVENTION

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to various systems and techniques that provide effective, efficient, and convenient ways of utilizing one or more databases to generate a customized set of operations.

A big data analysis system may include a big data repository communicatively coupled to a data accumulation server, a predictive modeling system, and a predictive graph processing system. The data accumulation server may be configured to receive information from a plurality of data sources, the information corresponding to user interaction with one or more computing devices associated with an organization via a networked computing system, store the information received from the plurality of sources in the big data repository; and monitor the plurality of data sources to update the data stored in the big data repository. The predictive modeling system and/or the predictive graph processing system may be configured to receive information stored in the big data repository, transform the information received from the big data repository into a predictive graph data set based on a predictive model, and store the predictive graph data set to a visualization data repository.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
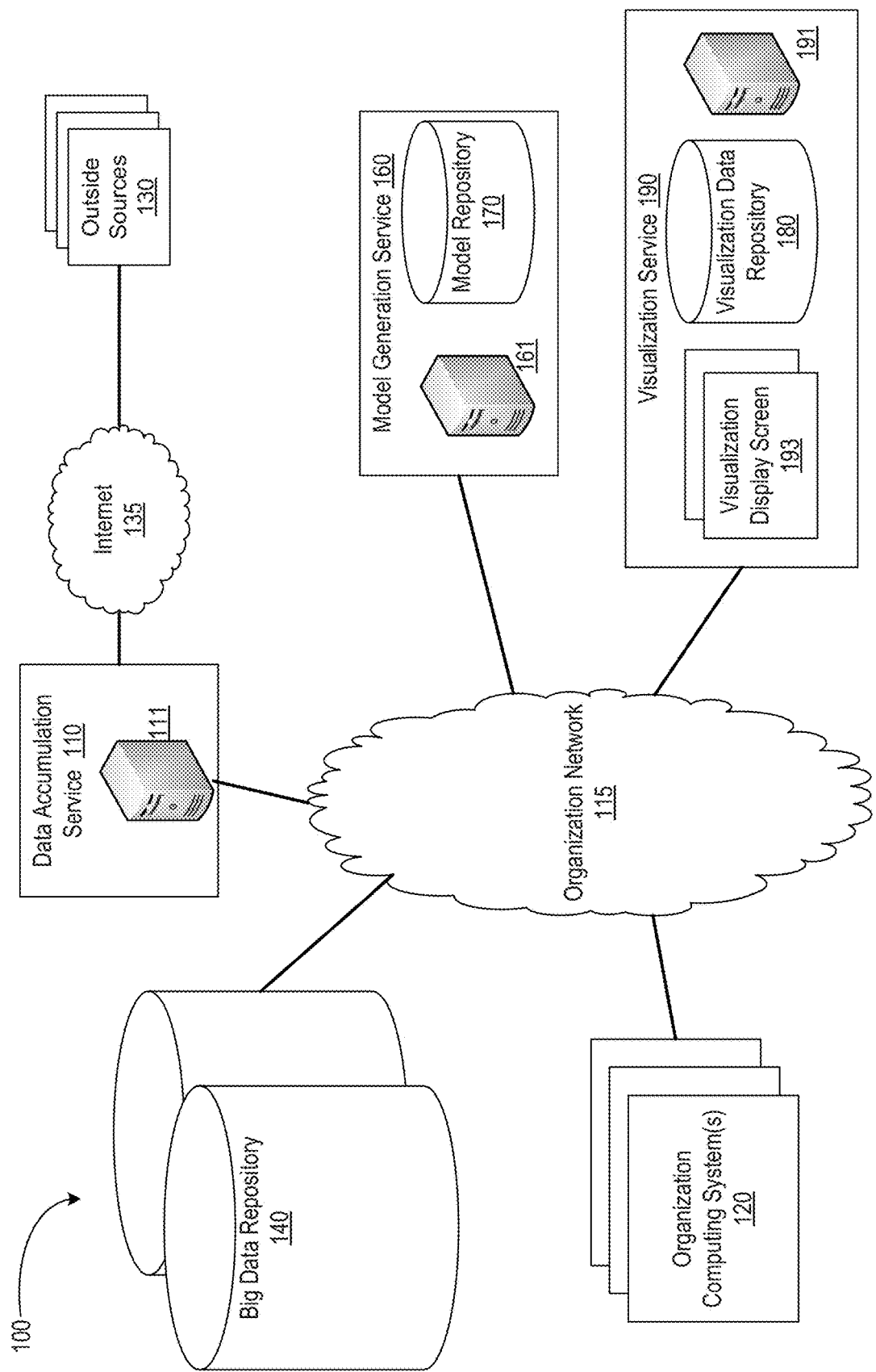
FIG. 1 depicts an illustrative networked computing system for analyzing information stored in a big data repository based on a plurality of predictive models and generating one or more predictive graphs based on the analysis in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

By combining graph-based data notation with big data processing capabilities, complex data analytic algorithms and predictive modeling techniques may be applied to provide a powerful and practical method to maintain huge volumes of complex data using big data technologies (e.g., enterprise data repositories, social media data repositories, relational databases, and the like), and the associated data processing models, (or social or professional media data) to process the big data repositories in near real time using the predictive models so that predictive graphs may be generated and presented to users upon demand.

In general, computers may be used to efficiently process data based on the rules expressed with a programming language (e.g., syntax). However, the goals (e.g., syntax) of the computer program may be limited by the constructs available. In many cases, graphical user interfaces may allow for presenting powerful visual structures for expressing real-world concepts and enterprise data in more easily understood formats. Predictive graphs may provide a particularly powerful mechanism for efficiently presenting information obtained from big data repositories with respect to predictive models. As such, big data technologies (e.g., cluster computing frameworks, APIs, graphing tools, and the like) may be used to transform big data repositories (e.g., Big Table repositories, and the like) into graph-based data which can now provide a practical mechanism for solving real-world computation problems when dealing with large volumes of data.

In some cases, graph-based notation may be used to present information stored in big data repositories, thus enabling complex analytics using predictive models associated with machine learning and/or predictive analytics. For example, a predictive model may be used to identify and/or leverage patterns found in historical and transactional data to identify and/or predict data-based relationships (e.g., risks, opportunities, and the like). Such models may be used to capture relationships between many factors to allow for generation of a visual representation of risk or potential associated with a particular set of conditions, thus allowing for presenting information that may be useful for guiding decision making for candidate transactions.

In some cases, cluster computing frameworks, data storage technologies (e.g., Big Table, and the like), data processing APIs (e.g., graph parallel computation APIs, and the like) and other such big data technologies may be processed in a large-scale networked architecture (e.g., Internet based, enterprise network based, and the like) to transform data into predictive data graphs that may be presented to a user on-demand. For example, such big data technologies may be implemented in an Internet-connected enterprise network to allow a user to mine big data technologies in near real time and to generate predictive graphs to present the analyzed data in an easily understood manner.

In an illustrative example, a business organization may utilize big data technologies in an enterprise computing system to gather and store large amounts of data generated within the organization's network and from one or more outside sources (e.g., social media networks, Internet websites, and the like). The enterprise computing system may store the data in a big data repository such as a scalable non-SQL database having low latency and high throughput (e.g., a Big Table) and utilize such data to perform complex analytics applying predictive analytic algorithms to generate data that may be used for predicting business outcomes based on the applied predictive models and/or for transforming the raw data stored in the big data repositories to mine data (e.g., key business insights and the like) as a visual representation in complex data situations. In some cases, the graph-based big data predictive analytic system may be configured to process data as a point-in-time "special" case without any time considerations. In some cases, the graph-based big data predictive analytic system may be used to process data as a general case with time-based data and time-based predictions. For example, the special case may utilize timeless predictive graphs and the general case may utilize one or more user-defined functions to realize a desired predictive model. Both cases may be solved with the proposed method.

In some cases, at least two forms may be expressed in the predictive models. In an illustrative example, two forms in which a predictive model may be expressed for the purpose of applying predictive analytics to data retrieved from a big data repository. In a first case, a table or big table representation of input data parameters to the model may cause a response of a particular output parameter (e.g., a score, and the like), or other such output parameters to be evaluated by the system to perform a prediction. In a second case, the predictive model may be expressed in the form of a function (e.g., a time-based function and the like) which may process input data parameters, evaluate the output(s) and return one or more predictive values. Each predictive model representation may be utilized and/or applied by the systems and methods discussed herein to provide practical solutions to many real-world problems.

In some cases, the graph-based big data predictive analytic system may be configured to maintain an updatable and/or scalable (e.g., massively scalable and the like) big data repository that, in some cases, may be formatted as a Big Table, or other data storage format (e.g., a relational database, an unstructured database, and the like). The graph-based big data predictive analytic system may be configured to receive large volume data updates, small volume data updates, or the like. In some cases, the data stored in the big data repository may be maintained using a graph-based notation. The graph-based big data predictive analytic system may be configured to separate graph-data preparation processing activities for ensuring data is ready for presentation to a user from on-demand usage activities (e.g., on-demand visualization generation) of the graph-data. For example, when a data update occurs, the graph-based big data predictive analytic system may process one or more predictive models to re-predict one or more results, metrics or other such predictors in response to the data update. In some cases, the graph-based big data predictive analytic system may respond to external (or internal) high volume data updates, in some cases in relation to the frequency that data updates occur or an amount of data that has been updated, to determine how quickly resulting updates may be applied to the processed data (e.g., vertices data, edge data, and the like) of a predictive graph. In some cases, the predictions may be time-insensitive. In some cases, the predictions may be generated as a function of time, or based on one or more other time-dependent algorithms.

The data processing power of the graph-based big data predictive analytic system may have limitations primarily dictated by data storage capacity, a data retrieval efficiency, a data processing latency, and the like as related to the computing (e.g., Big Data) environment, often relative to the data set size to be processed. While such processing characteristics may be related to the processing power of the computing cluster or computing system, the graph-based big data predictive analytic system may offer practical solutions to limitations related to processing data stored in other technologies (e.g., an SQL database, and the like).

In a first illustrative example, consider information mined or otherwise retrieved from an Internet-based network of social connections that may be analyzed to predict information (e.g., sentiment information, opportunity analysis information, and the like) that may be stored as a data structure within an enterprise computing network from which one or more predictive graphs may be generated and displayed for user interaction. For example, as the number of individuals participating in a social network (e.g., an Internet-based social network, a private social network, and the like) grows, the number of actual and/or possible social connections grows super-exponentially. In some cases, a predictive model inputs may include a binary input (e.g., an input sentiment representation such as "like", "dislike", and the like) which may be combined with one or more other model input variables (e.g., demographic information, peer group information, location information, and the like)when being processed using a predictive model to generate output information that may be stored in a table or other such storage mechanism (e.g., a data structure and the like) such as to identify, sometimes in real-time, which individual may be identified to receive an opportunity for a product or service.

In another illustrative example, consider data stored in a big data repository corresponding to individuals defining a network of potential clients, which may be organized by peer group segment. Such big data repository-stored information may grow quickly based on population demographics and/or expansion of geographic areas of interest, or other such reasons. In some cases, and on a periodic basis (e.g., daily, weekly, and the like), sizable numbers of the population have their birthday on a particular day, which may result in a reclassification as they move from one peer group segment into the next. In many cases, all, or at least some, of the individuals in any given graph may be connected by some common factors such as demographics. Further, on the same predictive graph or different predictive graphs, other alternative segmentations as may be used for particular predictive models (e.g., a business opportunity predictive model, a business risk predictive model, an insurance risk predictive model, and the like), such as peer group-based segmentations (e.g., a first peer group-based segmentation for a first model, a second peer group-based segmentation for the first model or a second model and/or the like). Even for extremely large amounts of information stored in a big data repository including information associated with considerable populations multiple relationship-graphs, multiple peer group-based segments and the like, peer group based predictive models may be applied to identify information targeted to a particular individual or segment of individuals. Often, such information may be identified using region-specific data parameters such as insurance risk based on demographic information and/or locality information, to identify products and/or offer products and/or services and store the results in the enterprise computing system to be used by one or more other business computing systems to offer products and/or services (e.g., an insurance policy, a student loan, a personal loan, an identification of whether to offer a standard mortgage vs a jumbo mortgage, a vehicle offer, a retirement investment opportunity, an advisory service and the like). In some cases, one or more predictive models may be applied information stored in a big data repository such as to generate one or more predictive graphs using additional information. For example, predictive models may be used to generate predictive graphs identifying one or more health risk factors, one or more insurance risk factors, or other risks that may be identified using one or more predictive models based on various predictive data parameters in addition to the peer group segment information as discussed above.

FIG. 1 depicts an illustrative networked computing system for analyzing information stored in a big data repository based on a plurality of predictive models and generating one or more predictive graphs based on the analysis in accordance with one or more example embodiments. In some cases, the big data predictive graph computing system 100 may include a data accumulation service 110, which may be a service implemented on one or more servers, such as a data accumulation server 111, may be communicatively coupled to one or more data sources, such as an organization computing system 120 via an organization network 115 and/or one or more outside sources 130 communicatively coupled to the data accumulation service 110 via an outside network (e.g., the Internet 135). The data accumulation service 110 may be configured to gather data from the plurality of organization computing systems 120 and/or the plurality of outside sources 130 and store the gathered data in one or more large data storage repositories, such as the big data repositories 140, via the organization network 105. The data accumulation service 110 may be configured to gather data over time, such as to receive new data, delete old data and/or to update existing data. In some cases, the data accumulation service 110 may be configured to update the data stored in the big data repositories 140 in response to a change in data at the source, at a predetermined intervals (e.g., near real-time, 1 second intervals, 1 minute intervals, and the like), or in response to a request to update data (e.g., an automated request, a user request, and the like).

The predictive graph processing system 150 may be communicatively coupled to the big data repositories 140, the model generation service 160, the model repository 170, the visualization data repository 180, and/or the visualization service 190 via the organization network 105. In some cases, the predictive graph processing system 150 may be communicatively coupled to the visualization service 190 via an outside network, such as the Internet 1301, a local area network (LAN), a wide area network (WAN), a telecommunications network, and/or the like. In some cases, such as in response to a visualization request, the predictive graph processing system 150 may retrieve graphical data stored in the visualization data repository 180 and communicate (with or without further processing) the retrieved graphical data via a communication network (e.g., the organization network 105, the Internet 135, and the like) for display on a display device associated with the visualization service 190 via one or more visualization screens 193.

One or more user devices may be communicatively coupled to the organization computing system 120 and/or the outside sources 130 via the organization network 115 and or the Internet 135, may be any type of computing device configured to provide the functionality described herein. For instance, the user device may be a desktop computer, server computer, laptop computer, tablet computer, smartphone, wearable device, automated teller machine (ATM), or the like. In some examples, the user device may be configured to receive and/or display a user interface, receive input via the user interface, and communicate the received input to one or more other computing devices. As such, the user device may provide a user interface (e.g., a web browser, a desktop application, a mobile application, or the like) that enables the user to input data to, and receive data from, the organization computing system 120, the outside sources 130, and/or the visualization service 190 when a user of the user devices is authorized to access the predictive graphs provided vis the visualization screens generated by the visualization server. The user device 162 may, in some instances, be a special-purpose computing device configured to perform specific functions.

The data accumulation service 110 may acquire user-related data and/or the user device utilized by a user to access an online portal from one or more internal systems (i.e., systems associated with and/or operated by the organization). In some examples, the internal systems may include organization servers of the organization computing system 120. The organization servers may be any type of computing device configured to provide the functionality described herein. For instance, the organization servers may be a database server, a file server, a web server, an application server, or the like. In some examples, the organization server may be configured to communicate with the data accumulation service 110 relating to information stored on the organization computing system 120. The organization computing system 120 may store, for example, information relating to one or more services offered by the organization, one or more applications by the organization, and/or one or more users associated with the organization. Further, the data accumulation service 110 may acquire user-related data and/or the user device utilized by a user to access an online portal from one or more external sources 130. For example, the data accumulation service 110 may acquire information from various social media channels, fitness trackers, Internet of Things (IoT) devices, and so forth.

The big data predictive graph computing system 100 may also include one or more networks, which may interconnect one or more of the organization computing system 120, the data accumulation service 110, the user devices, the predictive graph computing system 150, the model generation service 160, the visualization service 190, the big data repository 140, the model repository 170, the visualization data repository 180, and the external sources 130. Thus, the different components of the big data predictive graph computing system 100 may be in signal communication with the user devices, the organization computing systems 120, and the external sources 130 via a network. The networks may include one or more of a wired network (e.g., the Internet 135, LAN, WAN, or the like), a wireless network (e.g., a cellular network, Bluetooth, NFC, or the like), or a combination of wired or wireless networks.

In some examples, the big data predictive graph computing system 100 may include an organization network 115. The organization network 115 may include one or more sub-networks (e.g., LANs, WANS, or the like). The organization network 115 may be associated with a particular organization (e.g., a corporation, enterprise organization, educational institution, governmental institution, and the like) and may interconnect one or more computing devices associated with the organization. For example, the data accumulation service 110, organization computing systems 120, and other such servers and systems may be associated with an organization (e.g., an enterprise organization), and an organization network 115 may be associated with and/or operated by the organization, and may include one or more networks (e.g., the Internet, LANs, WANs, VPNs, or the like) that interconnect the organization components of the big data predictive graph computing system 110, organization computing systems 120, and one or more other computing devices and/or computer systems that are used by, operated by, and/or otherwise associated with the organization.

It will be appreciated that the big data predictive graph computing system 100 illustrated in FIG. 1 is shown by way of example and that other implementations of a big data predictive graph computing system 100 may include additional or alternative components, modules, sub-modules, and so forth. In this example, the big data predictive graph computing system 100 includes one or more processors, one or more memory devices, a communication interface, visualization device, user input and output interfaces, and the like. Also, in this example, the big data predictive graph computing system 100 includes the big data repository 140, the model repository 170, and the visualization data repository 180 Thus, the various components of the big data predictive graph computing system 100 may be implemented using a special-purpose computing device (or computing devices) that have been specially programmed to perform functionality according to one or more aspects of the present disclosure.

The one or more processors 112 (e.g., microprocessor, microcontroller, and the like) of the user interaction optimization system 110 may operate by using an algorithm that facilitates gathering of information from a plurality of sources, such as the outside sources 130 and the organization computing systems 120, and receiving a request, such as from an expiration of a timer, from an indication that data has changed and/or from a user device to gather information from a plurality of sources, storing the received information in a big data repository 140, generate one or more predictive models for analyzing the data stored in the big data repository 140, generating a plurality of predictive graph data sets, and, in response to a request to display a visualization of the predictive graph, generating a predictive graph based on one or more of the plurality of predictive graph data sets and sending the predictive graph to a display device for display. Additionally or alternatively, the one or more processors 112 may operate by using an algorithm that facilitates updating the data stored in the big data repository 140 in near real time, and generating, in near real time, predictive graph data sets based on the updated information stored in the big data repository 140. These algorithms may be included as instructions stored in the one or more memory devices and may be included as a portion of one or more of the data accumulation service 110, the predictive graph processing system 150, the model generation service 160 and/or the visualization service 190. Additionally, the one or more processors may operate by receiving information from the one or more external sources 130. Illustrative algorithms will be described below with reference to FIG. 2.

In this example, the one or more processors may be configured to operate the data accumulation service 110, the predictive graph processing system 150, the model generation service 160 and/or the visualization service 190 using an operating system (e.g., Windows, Linux, Unix, GNU, OS X, iOS, Android, and so forth.). In some cases, the one or more memory devices may be communicatively coupled to the one or more processors, such as via a data bus. The one or more memory devices may be used to store any desired information, such as the aforementioned algorithm, a lookup table, computer-executable instructions to implement the generation of a set of operations, a set of products and services, and/or the like. The one or more memory devices may be any suitable storage, including, but not limited to RAM, ROM, EPROM, flash memory, a hard drive, and so forth. In some examples, the one or more processors may store information within and/or may retrieve information from the one or more memory devices The communication interface of the data accumulation service 110, the predictive graph processing system 150, the model generation service 160 and/or the visualization service 190, which may be implemented using one or more visualization servers 191, may facilitate communication between the data accumulation service 110, the external sources 130, and/or the organization computing systems, via a network using one or more wired or wireless communication links. In some examples, the data accumulation service 110 may include one or more computing devices that may be communicatively coupled to a network. The network may be communicatively coupled to one or more devices, such as to servers associated with the external sources 130, the user device, and/or the organization computing systems 120. The network may include one or more wired and/or wireless networks, such as a telecommunications network (e.g., a cellular network, a land line network, a cable network, and the like), a Wi-Fi network, a local area network (LAN), a wide area network (WAN), the Internet, and the like. When used in a LAN networking environment, the data accumulation service 110 may include a modem and/or other means for establishing wired and/or wireless communication over the WAN, such as the Internet. It will be appreciated that the network connections discussed herein are illustrative and other means of establishing communication links between the data accumulation service 110, the external sources 130, the user devices, and/or the organization computing systems 120 may include one or more various protocols such as TCP/IP, Ethernet, FTP, HTTP, and so forth.

In some cases, the big data repository 140 may be managed, or otherwise processed, by a big data processing engine and/or big data processing service. The big data processing engine may comprise one or more servers or other computing devices configured to manage the big data repository 140 and/or to process extremely large amounts of data. The big data processing engine may be configured to operate under a cloud computing environment, a cluster computing environment and/or a proprietary computing environment and may include one or more highly scalable components for managing extremely large amounts of information. The big data repository 140 may further store information related to a current or previous users' interactions with the organization's products or services or information obtained from one or more outside sources 130 corresponding to the use of the organization's products and services. The big data repository 140 may track information relating to interactions via various channels, including mobile devices, desktops, laptops, ATMs, wearable devices, and so forth. As such, the big data repository 140 may store information relating to users accessing an organization's services via a mobile application, a mobile browser, a desktop application, a desktop browser, a wearable device application, and so forth. In some examples, the big data repository 140 may store metrics associated with a user's interaction with some or all pages associated with the organization. In other examples, the big data repository 140 may store metrics associated with a user's interaction with some or all products and services provided by the organization. Further, the big data repository 140 may store metrics associated with a specific page and/or product and service, as well as aggregate metrics associated with a plurality of pages or products and services. For instance, the big data repository 140 may store a user ID, a username, browser(s) used to access organization's services, language(s) used to access organization's services, computing device(s) used to access organization's services (e.g., a smartphone, a laptop, a tablet, a wearable device, and so forth), screen resolution(s) used to access organization's services, location(s) (e.g., an address, a coordinate, or a generic description, such as coffee shop or home, and so forth) and/or IP address(es) from which organization's services were accessed, network speed(s), a number of times the user has accessed a particular page, a number of times the user accesses the same pages from different devices, the date(s) and time(s) at which the user accessed pages, the page(s) which the user has accessed, the referring page(s) (i.e., the pages the user was on before coming to the current page), product and service(s) (e.g., product and service ID(s)) previously viewed by the user, average number of product and service(s) viewed/clicked in a session), average time spent on a page, average time spent reading information associated with a product and service, minimum/average/maximum number of concurrent tabs accessing the organization's services, minimum/average/maximum time spent on page(s), number of single-page visits, time elapsed since last interaction with the current page, and so forth. Additionally, in some cases, some or all user engagement metrics stored in the big data repository 140 may be associated with one or more predefined events identified by the data accumulation service 110. Further, in some examples, the big data repository 140 may maintain historical values of user engagement data (e.g., user engagement with products and services), such that the data accumulation service 110 may provide more relevant subset of products and services to a user based on this historical data. In some cases, the big data repository may store information (e.g., data structures, files, and the like) corresponding to the operation of the organization including employment information, profit information, loss information, sales information, inventory information, and other such operational business information.

In some cases, the predictive graph processing server 150 may process information stored the big data repository 140 based on a model stored as a Big Table, such as a static predictive model Big Table 173 stored in the model repository 170. The static predictive model big table 173 may include one or more predictive measure values corresponding to a particular predictive model or predictive model type. In such cases, the static predictive model Big Table 173 may include time invariant data. In other words, the static predictive model Big Table 173 does not include values having any dependence on time. In such case, the predictive graph processing server 150 may process information stored in the big data repository 140 based on the static predictive model big table 173 with joins being performed directly on the static predictive model big table 173, such as with the graph vertices and/or graph edges stored in the visualization data repository 180, which may also be stored in a Big Table format.

In some cases, the predictive graph processing server 150 may process information stored the big data repository 140 based on a model stored as a big table, such as a dynamic predictive model big table 173 stored in the model repository 170. In such cases, the dynamic predictive model big table 173 may include predictive measure values for a particular dynamic predictive model having a dependence on time. This time-dependence may be contained either explicitly, as adjunct historical data used for joining with a corresponding predictive graph big table being contained at a graph vertex or edge. In an illustrative example, a utility company bill may contain data representative of a month-on-month comparison of data points for a given client. In such cases, processing may be performed directly on the dynamic predictive model big table 173, such as with the graph vertices and/or graph edges stored in the visualization data repository 180 with joins being performed on the Predictive Model table.

In some cases, the predictive graph processing server 150 may process information stored the big data repository 140 based on a model stored as a Big Table, such as a dynamic predictive model Big Table 175, Implicitly as part of the predictive model itself, with the predictive measure being a function of an input time variable. In an illustrative example, a peer group-based client retirement savings predictive model may use the client's date of birth as a time-based parameter for use in predicting an amount of retirement savings needs for the client. This prediction can be based upon a business-driven model created by the data science team, utilizing one or more predictive modeling methodologies, such as the ones discussed above.

In some cases, the predictive graph processing server 150 may be configured for rendering graph-based visualization data for display. For example, in some cases, all or at least a portion of the data may be pre-processed for graph-based representation using RDDs to be made ready for display via user interface screen 193. In some cases, the one or more visualization data sets may correspond to respective predictive graphs that may be displayed by the visualization service 190. Here, the graph data may be queried for visualization using RDGs by the predictive graph processing server. Such predictive graph information may be stored in the visualization data repository 180 and may be transformed into a predictive graph format by the predictive graph processing server, the visualization service 190 and/or the like.

Advantages may include, but are not limited to empowering enterprises and other entities (e.g., a business organization, a governmental agency, an educational institution and the like). In such cases, an entity may enable complex data analytics on large volumes of complex enterprise data, by utilizing a novel and practical method using big data Technologies for predictive graph analytics, such as by using the predictive graph processing server 150. In some cases, the graph processing server 150 may be configured to mine metrics (e.g., key business insights) using one or more powerful graph notations and predictive models stored in the model repository 170 and/or generated by the model generation service 160 which may be implemented using one or more model generation servers 161. In some cases, both static predictive models and dynamic predictive models may be scalable to large volumes of enterprise data, such as the information stored in the data repository 140 that may be obtained by the data accumulation service 110 from organization computing systems 120 and/or one or more outside sources 130. The predictive graph processing server 150 and/or the data accumulation service 110 may further be configured to perform scalable maintenance of voluminous updates to new data situations, as well as efficiently propagating these data situation updates to re-predict or re-analyze the metrics to be displayed in a predictive graph. For most real-world problems, such as those with straightforward predictive models, the big data predictive graph computing system 100 may be both practical and scalable by leveraging a unique hybrid combination of big data technologies. The real-time or near real-time processing capability of the big data predictive graph computing system 100 may be dependent upon the capacity of the available big data Platform (e.g., hardware, software, firmware, and the like), relative to any given size of data. For example, smaller data sets stored in the big data repository 140 may be require less processing capacity of the various servers of the big data predictive graph computing system 100. Depending upon the availability of distributed computing power from the big data Platform, the big data predictive graph computing system 100 may selectively customize the frequency of RDD processing using one or more APIs and/or RDG processing using Graphs, or even H-Base updates.

Figure 2:
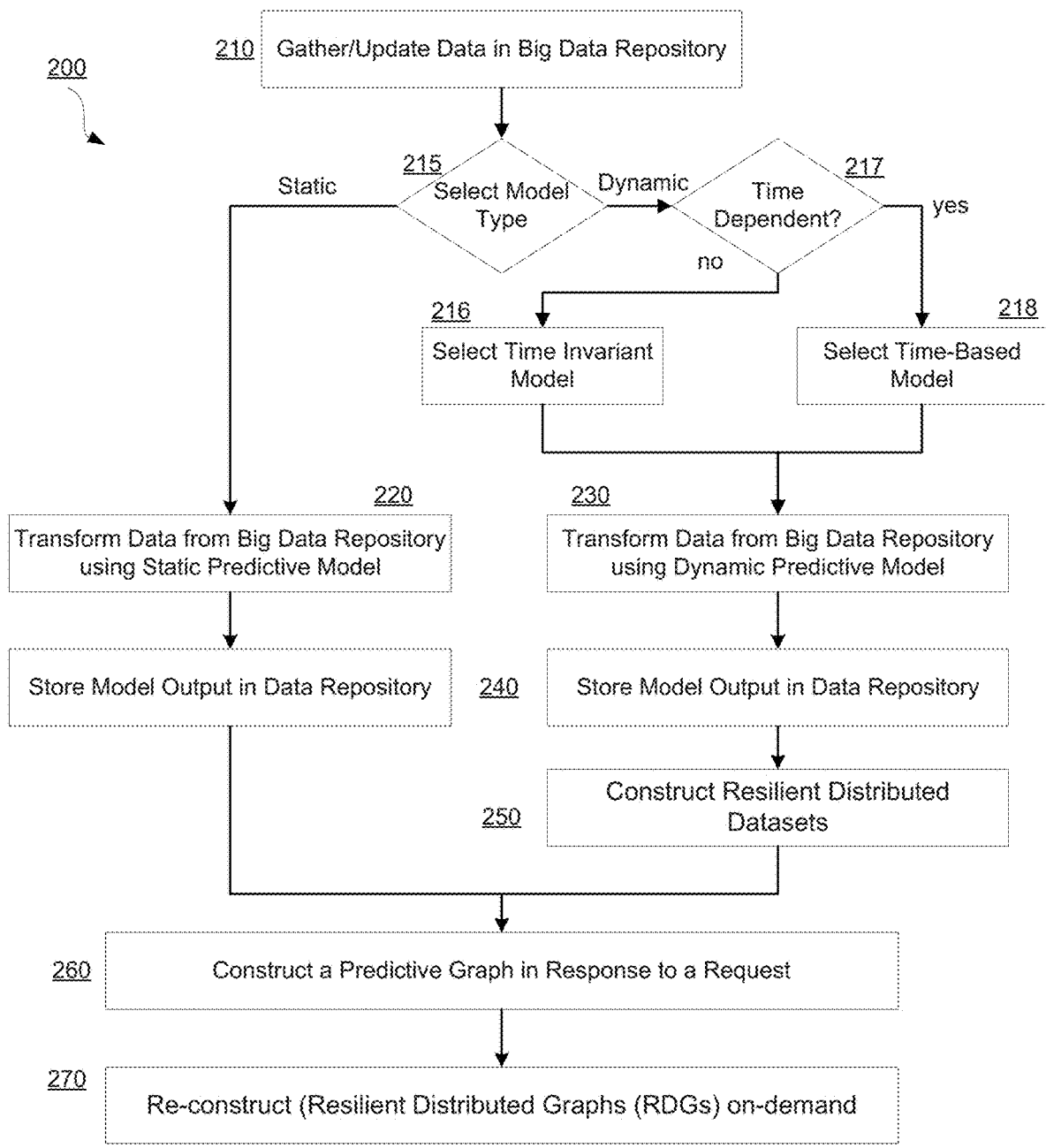
FIG. 2 depicts an illustrative method for analyzing information in a big data repository and generating one or more predictive graphs in accordance with one or more aspects described herein.

FIG. 2 depicts an illustrative method 200 for analyzing information in a big data repository and generating one or more predictive graphs in accordance with one or more aspects described herein.

At 210, the graph-based big data predictive analytic system may be configured to process large volumes of data using one or more predictive models, such as a static predictive model or a dynamic predictive model. In an illustrative example, the static predictive model may be defined using a Big Table format, where a predictive graph big table may be defined as including:

<Organization metrics data, Input variables, Output variable (Prediction)>.

In some cases, the dynamic predictive model may be implemented as a predictive analytics function (e.g., a user defined function (UDF), a predefined function or other such equation-based or time-based format). In such cases, the predictive analytics function may include one or more regression techniques or machine learning techniques. For example, the regression techniques may include one or more of a linear regression model, a discrete choice model, a logistic regression model, a multinomial logistic regression model, a probit regression model, a logit versus probit model, a time series model, a duration analysis model, a regression tree model, and/or a multivariate adaptive regression spline model. In some cases, the machine learning techniques may include one or more of a neural network-based model, a multilayer perceptron (MLP) model, a radial basis function model, a support vector machine model, a naive Bayes model, a k-nearest neighbor model, a geospatial predictive model, and/or the like. Such models may be generated using a programming language associated with the cluster computing framework and/or the graph parallel computation APIs. In some cases, a model generator may pre-define one or more models used to transform data stored in the big data repositories into data formatted for presentation via a predictive graph in response to a request. For example, raw data stored in the Big Table data repositories may be transformed via a static predictive model or a dynamic predictive model into a graphical format such as a vertex dataset or edge dataset by joining on key parameters.

At 205, the predictive graph processing system 150 may select a static predictive model or a dynamic predictive model. If, at 205, a static predictive model has been selected, an immutable predictive model (e.g., a static predictive model) may be used to transform raw data into a graphical format for presentation via a predictive graph at 220.

If, at 205, a dynamic predictive model has been selected, either manually by a user or via an algorithm processed by a server, a time dependency associated with the model may be specified at 217 via an algorithm by the server or manually by a user. If a time-invariant dynamic model has been selected, mutable (e.g., updateable) predictive model data may be joined with the raw data set such as by applying any input data updates to a time-invariant predictive model (e.g., a Big Table Input), to newly predict the corresponding new output value(s) based on the applied time-invariant predictive model (e.g., a function where time is not used as a variable), to transform the raw data into a graphical format for presentation via a predictive graph at 216 and 230. Likewise, if a time-dependent dynamic model has been selected, mutable (e.g., updateable) predictive model data may be joined with the raw data set such as by applying any input data updates to a time-dependent predictive model (e.g., a Big Table Input), to newly predict the corresponding new output value(s) based on the applied time-dependent predictive model (e.g., a function having at least time as a variable, f(t), and the like), to transform the raw data into a graphical format for presentation via a predictive graph at 218 and 230. At 240, the output of the predictive model may be stored in the visualization data repository 180 or the model repository 170, such as in a data structure corresponding to one or more predictive graph formats, such as a vertices/edge graph format.

At 250, when using a dynamic predictive model, the analysis engine may newly construct Resilient Distributed Datasets (RDDs) as frequently as necessary depending upon the desired frequency of data updates by using one or more functions included as part of the graph parallel computation API to process data corresponding to each vertex and/or each edge to newly transform the data for presentation via a user interface.

At 260, in response to a request to display a predictive graph, for both cases, such as use of the mutable predictive models and the immutable predictive models discussed above, the predictive graph processing system 150 may be configured to re-construct (Resilient Distributed Graphs (RDGs) on-demand (e.g., in response to a query, upon expiration of a duration, and the like) for re-processing the new graph values at each vertex and edge based on functions of the graph parallel computation API.

At 270, The RDGs constructed using the graph parallel computation AP in response to the request for generation of the on-demand query-time visualization (e.g., a predictive graph), the predictive graph generation server may generate and communicate the generated RDGs as one or more visualization screens for presentation via a user interface device as at least a portion of a user interface screen. In this big data predictive computing system, data updates may be received via the organization computing network, the Internet, or other such networking environment in real-time or near real-time. In such cases, the data updates may be processed in real-time or near rea-time by the big data predictive graph computing system and the processed data may be stored in the big data repository or other such repository for later use. In some cases, such as in response to a request for presentation of the processed data via a predictive graph, the processed data may be transformed into a predictive graphical format to be communicated to a display device via the organization interface.

Figure 3:
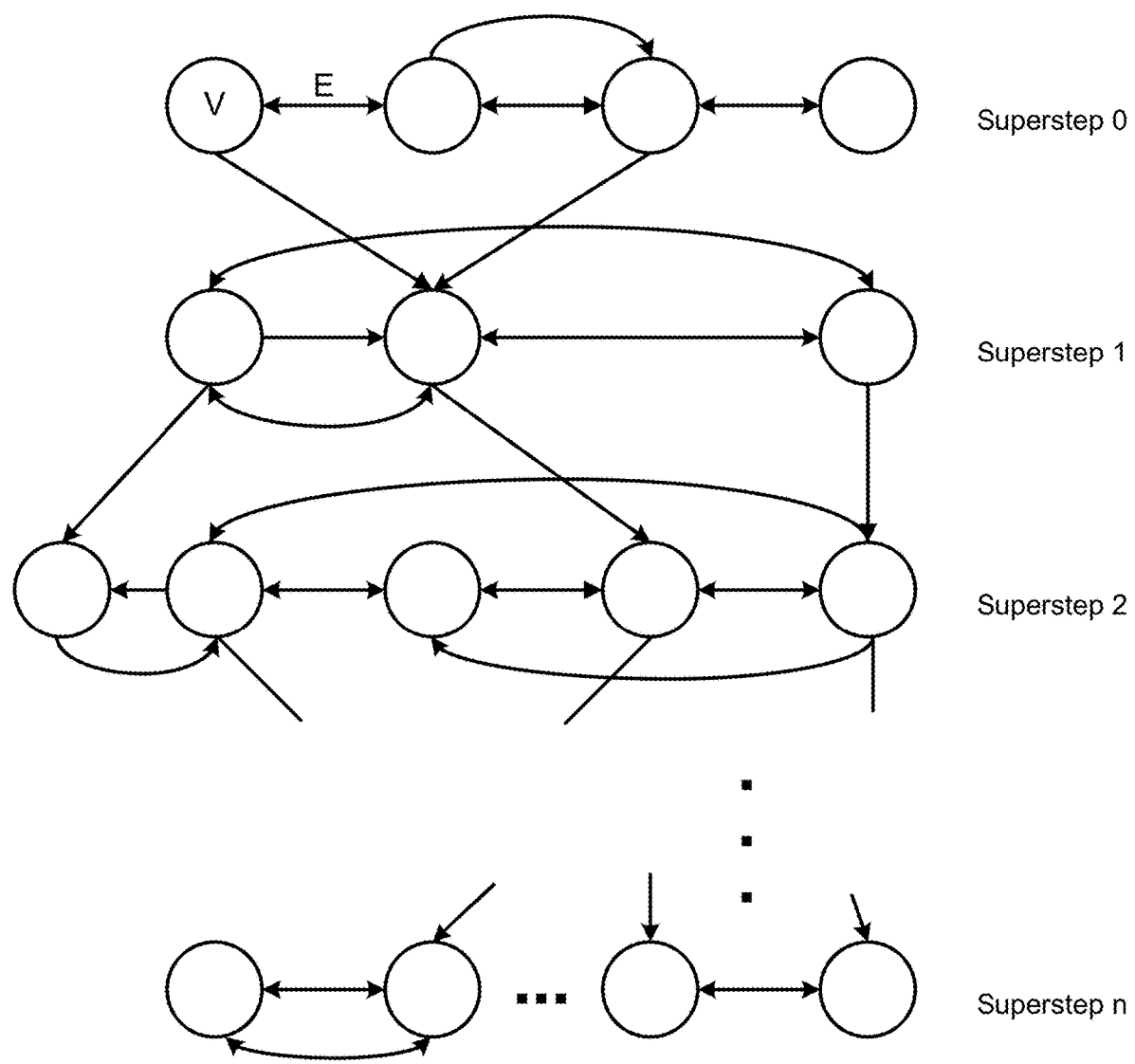
FIG. 3 depicts an illustrative predictive graph format in accordance with one or more aspects described herein.

FIG. 3 depicts illustrative predictive graph formats in accordance with one or more aspects described herein. The predictive graph may take the form of one or more of a plurality of graph formats, including a system of interconnected vertices. If we think of a social network site as a graph, each individual may be connected by some kind of relationship, such as a colleague, a friend and the like. A graph is thus an easier way to represent and understand problems. Systems represent either concrete or conceptual objects, but that alone is not sufficient, as the graph also describes relationships between objects.

Semantic relationships are simple for humans to understand, but not for computers as computers can't represent semantics correctly, though they are good in processing syntax. By using a graph, mapping complex concepts becomes easier. Because computers are lacking in semantic understanding, optimizing what information may actually be needed out of a graphical representation is a challenge with most current data processing technologies.

Earlier these issues were addressed by ontology, to conceptualize the object or abstraction using ontology. With large volumes of data, the graph or ontology is time consuming to process; it may also not be possible to get the exact output that is required. In this situation parallel data distribution and parallelized data processing would be the best option for any enterprise.

Graphical API interfaces to a cluster computing framework associated with big data repositories may include a collection of algorithms like PageRank, Triangle counts and connected objects. These algorithms were developed based on a Bulk Synchronous Parallel Model by a large Internet search and technology development organization. This model uses a distributed process doing work using a superstep. The superstep is formulated as below. In general, messages are only activated when all the distributed processes finish, and processing can move forward to the next superstep.

In an illustrative example as shown in FIG. 3, a vertex may be connected to an adjacent vertex via an edge. An interconnected series of vertices and edges may be grouped to form a superstep, where a vertex receives and/or reads a message from a previous superstep. A function may be applied to each of the vertices in a superstep, where messages may flow along the edges to the appropriate vertex. Each vertex has an active state and an inactive state where, in each superstep, a function may be applied to the active vertex. In some cases, such as at superstep 0, a message may be communicated to all active vertices. A process described by the predictive graph may terminate when all vertices are inactive.

Figure 4:
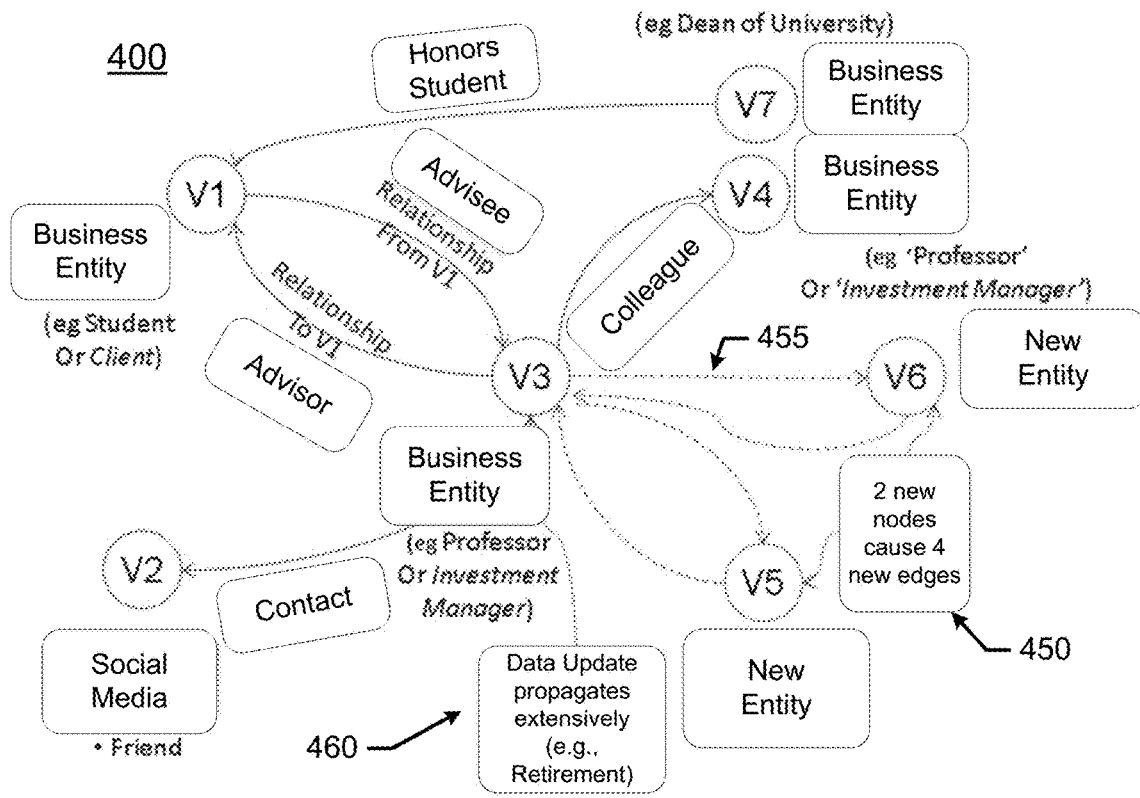
FIG. 4 depicts an illustrative visualization of data stored in a big data repository along with the corresponding data tables.

FIG. 4 depicts an illustrative visualization 400 of data stored in a big data repository along with the corresponding tables including a vertices table 410, an edge table 420 and a result set table 430. This illustrative visualization graph shows a visual representation of relationships between individuals based on information stored in the big data repository 140. For example, each vertex corresponds to an individual, each edge describes a relationship between the corresponding individuals (vertices) and the result set describes the results of the combination of vertices and edges. For example, a graph of this type may be used to illustrate relationships between individuals using data stored in the big data repository 140 that may be sourced from one or more external (or internal) networks, such as a business network, a social network, and/or the like. These graphs may be used to show relationships between individuals in a number of settings, such as an education setting (e.g., student/teacher/dean, and the like), a business environment (e.g., a client/advisor/manager relationship structure, and the like) or other such interpersonal relationships. While interpersonal relationships are shown in the illustrative example, other relational information may also be shown in these graphs (e.g., predictive graphs), such as product/vendor relationships, marketing information, sales information, scientific data, anthropological information, psychological study information, and/or other such information that may be obtained and/or stored in big data repositories. In some cases, visualizations may include representations of data stored in the big data repository 140, and/or predictive data corresponding to the data stored in the big data repository. In many cases, the visualization 400 may be updated and/or regenerated based on one or more updates to the data stored in the big data repository 140. In such cases, the data updates may comprise a status update to data corresponding to a vertex (e.g., a retirement update 460, a new vertex addition 450, and the like). In the illustrative example, the vertex table may be updated in the data update 450 to include vertices V5 and V6. In some cases, a predictive graph may be generated such that the edges 455 may comprise one or more predictive relationships between the vertices. In some cases, one or more of the edges 455 may correspond to an actual relationship between the vertices.

Figure 5:
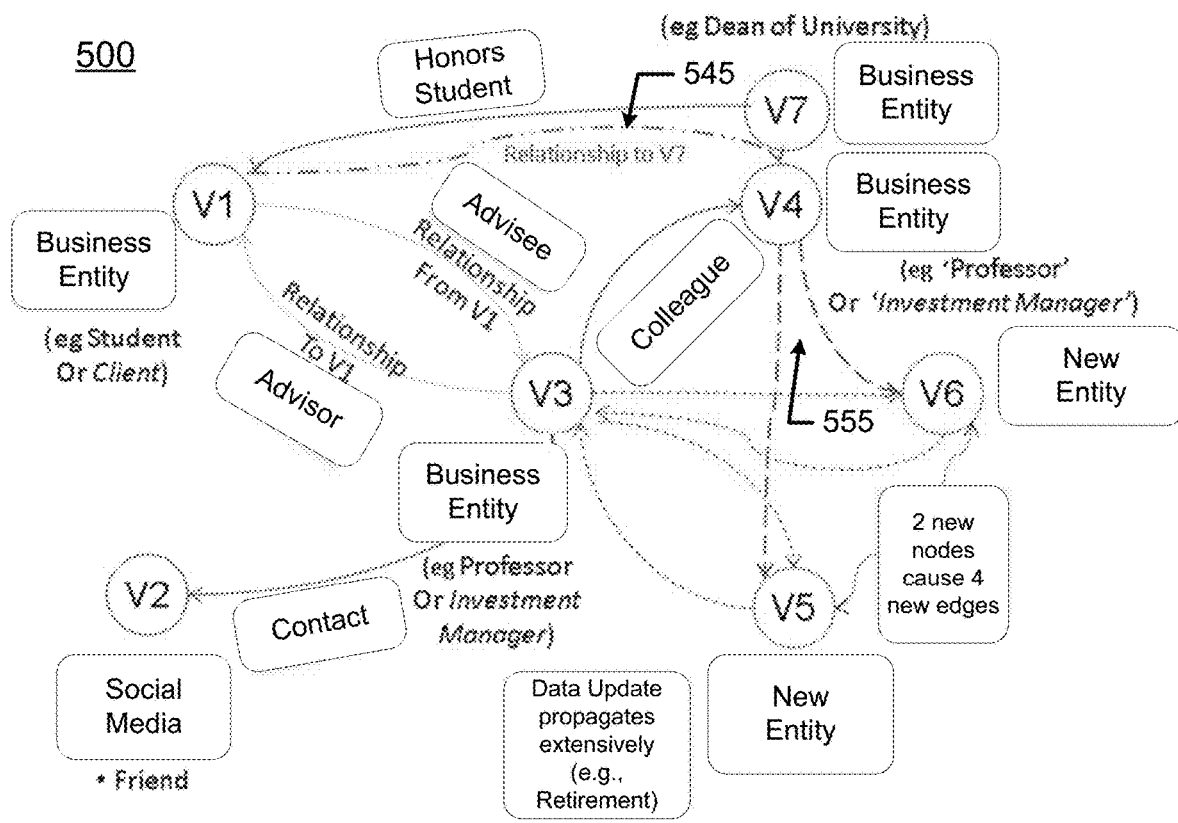
FIG. 5 depicts an illustrative visualization of a predictive graph corresponding to data stored in a big data repository along with a corresponding result set table.

FIG. 5 depicts an illustrative visualization 500 of a predictive graph corresponding to data stored in the big data repository 140 along with a corresponding result set table 530, where the predictive graph may correspond to a prediction based on an update to the data stored in the big data repository 140. Here the illustrated example shows an edge 545 corresponding to a predicted relationship between V1 and V4, based on a data update to the big data repository, such as where information indicates that the individual corresponding to V4 has replaced V7 as "dean" or has otherwise moved into a role formerly occupied by the individual corresponding to V7. Other illustrative relationships (e.g., edges 555) between the individuals corresponding to V4, V5 and V6 may be shown in response to information updated corresponding to a retirement action (e.g., update 460) and/or resulting from the update 450 adding information corresponding to V5 and V6. In some cases, predictions may be visually represented on the predictive graph, such as by using dashed lines, colors, or other visual indicators. In some cases, predictions shown in a predictive graph may be shown as an updated predictive result table or other textual representation. In some cases, the predictive graphs may include a combination of visual indicators and textual representation of a predictive result set (e.g., graphs, tables, labels, arrows, and the like).

One or more aspects of the disclosure may be embodied in computer-usable data or computer-executable instructions, such as in one or more modules, executed by one or more computers or other devices to perform the operations described herein. Generally, modules include routines, programs, objects, components, data structures, and the like that perform particular operations or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

The invention claimed is:

1. A system comprising:
   a data accumulation server communicatively coupled via a network to a data repository, wherein the data accumulation server comprises
      a first processor; and
      first non-transitory memory storing first computer-readable instructions that, when executed by the first processor, cause the data accumulation server to:
         receive information from a plurality of data sources, wherein the plurality of data sources comprises two or more of business computing systems, social media networks, and user devices;
         store the information received from the plurality of data sources in the data repository;
         monitor the plurality of data sources for at least one data change event at one or more of the plurality of data sources; and
         update, based on the data change event, the data stored in the data repository into an updated data set; and
   a predictive graph processing system comprising:
      a second processor;
      second non-transitory memory storing second computer-readable instructions that, when executed by the second processor, cause the predictive graph processing system to:
         retrieve information from the data repository;
         transform, based on a predictive model, the information retrieved from the data repository into a predictive graph data set;
         predict, based on an indication of the data change event and using the predictive model, a first relationship between a plurality of objects of an updated data set, wherein the first relationship between the plurality of objects of the updated data set comprises a semantic relationship;
         store the predictive graph data set to a visualization data repository, wherein the predictive graph data set comprises the first relationship; and
         cause display, based on a visualization request, a visualization of the predictive graph data set comprising an indication of the first relationship between the plurality of objects of the updated data set.

2. The system of claim 1, wherein the first computer-readable instructions further cause the data accumulation server to update the data stored in the data repository in near real time.

3. The system of claim 1, wherein the first computer-readable instructions further cause the data accumulation server to update the data stored in the data repository on a periodic basis.

4. The system of claim 1, wherein the second computer-readable instructions further cause the predictive graph processing system to select one of a static predictive model and a dynamic predictive model.

5. The system of claim 4, wherein the static predictive model comprises a big table format comprising a plurality of inputs, a plurality of outputs and organization metrics data.

6. The system of claim 1, wherein the predictive model comprises a regression model.

7. The system of claim 1, wherein the predictive model comprises a machine learning algorithm.

8. The system of claim 1, wherein the second computer-readable instructions further cause the predictive graph processing system to transform, in real time, the information into a predictive graph data set based on the predictive model.

9. The system of claim 1, wherein the second computer-readable instructions further cause the predictive graph processing system to generate a predictive graph visualization in response to a request received by the predictive graph processing system.

10. The system of claim 9, wherein the second computer-readable instructions further cause the predictive graph processing system to communicate the predictive graph visualization via a network to a display device.

11. The system of claim 1, wherein the second computer-readable instructions further cause the predictive graph processing system to:
store, in a model repository, a first predictive model in a tabular representation, wherein input data received during processing result in a first predictive output corresponding to a static model;
store, in the model repository, a second predictive model expressed as a predictive function, wherein function input parameters, processed via the predictive function, result in a second predictive output corresponding to a dynamic predictive model; and
generate, based on a specified one of the first predictive model or the second predictive model, the predictive graph data set on a periodic basis.

12. A method, comprising:
receiving, by a predictive graph processing platform, information stored in a data repository, wherein the information is stored in the data repository by a data accumulation service and is updated in near real time;
updating the data stored in the data repository into an updated data set based on identification of a change to data at a data source of a plurality of data sources, wherein the plurality of data sources comprises a social media network;
transforming the information received from the data repository into a predictive graph data set based on a predictive model, wherein the predictive model comprises one of a static model or a dynamic model;
predicting, based on the updated data set, at least a first semantic relationship between a plurality of objects of the updated data set using the predictive model;
storing the predictive graph data set to a visualization data repository, wherein the predictive graph data set comprises a vertices table and an edge table and wherein each edge stored in edge table represents a semantic relationship between two vertices;
generating a predictive graph visualization for presentation at a user device in response to a request received at the predictive graph processing system; and
communicating the predictive graph visualization to a display device for display to a user; and
receiving, via an input device, an input from a user corresponding to user interaction with the predictive graph visualization comprising one of a desired action to be performed based on the predictive graph data set or an update to the predictive graph data set.

13. The method of claim 12, further comprising:
updating, in real time, the information stored in the data repository.

14. The method of claim 12, further comprising:
updating, based on a data change, the information stored in the data repository.

15. The method of claim 12, further comprising:
selecting, by the predictive graph processing platform, one of a static predictive model and a dynamic predictive model.

16. The method of claim 15, wherein a static predictive model comprises a big table format comprising a plurality of inputs, a plurality of outputs and organization metrics data.

17. The method of claim 15, wherein the predictive model comprises one of a regression model or a machine learning algorithm.

18. Non-transitory computer readable media, storing instructions that, when executed by a processor, cause a computing device to:
receive information from a plurality of data sources, wherein the plurality of data sources comprises two or more of business computing systems, social media networks, and user devices;
store the information received from the plurality of data sources in a data repository;
monitor the plurality of data sources for at least one data change event at one or more of the plurality of data sources;
update, based on the data change event, the data stored in the data repository into an updated data set;
transform, based on a predictive model, the information retrieved from the data repository into a predictive graph data set;
predict, based on an indication of the data change event and using the predictive model, a first relationship between a plurality of objects of an updated data set, wherein the first relationship between the plurality of objects of the updated data set comprises a semantic relationship;
store the predictive graph data set to a visualization data repository, wherein the predictive graph data set comprises the first relationship; and
cause display, based on a visualization request, a visualization of the predictive graph data set comprising an indication of the first relationship between the plurality of objects of the updated data set.

19. The non-transitory computer readable media of claim 18, wherein the instructions further cause the computing device to:
generate a predictive graph visualization in response to a request received by a predictive graph processing system; and communicate the predictive graph visualization via a network to a display device.

20. The non-transitory computer readable media of claim 18, wherein the instructions further cause the computing device to:

store, in a model repository, a first predictive model in a tabular representation, wherein input data received during processing result in a first predictive output corresponding to a static model;

store, in the model repository, a second predictive model expressed as a predictive function, wherein function input parameters, processed via the predictive function, result in a second predictive output corresponding to a dynamic predictive model; and generate, based on a specified one of the first predictive model or the second predictive model, the predictive graph data set on a periodic basis.

* * * * *